(12) United States Patent
Stehr et al.

(10) Patent No.: US 8,141,355 B2
(45) Date of Patent: Mar. 27, 2012

(54) HYDRAULIC SYSTEM FOR AN AUTOMATIC TRANSMISSION

(75) Inventors: Reinhard Stehr, Bühl (DE); Eric Müller, Kaiserslautern (DE); Jochen Pfister, Strasbourg (FR); Roshan Willeke, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 712 days.

(21) Appl. No.: 12/220,790

(22) Filed: Jul. 28, 2008

(65) Prior Publication Data

US 2009/0038305 A1    Feb. 12, 2009

Related U.S. Application Data

(60) Provisional application No. 60/998,565, filed on Oct. 10, 2007, provisional application No. 60/963,756, filed on Aug. 7, 2007.

(51) Int. Cl.
*F16D 31/02* (2006.01)
(52) U.S. Cl. ......................................................... 60/430
(58) Field of Classification Search .................... 60/414, 60/428, 430
See application file for complete search history.

(56) References Cited

U.S. PATENT DOCUMENTS

| 6,350,108 | B1 | 2/2002 | Haupt ............................. 417/364 |
| 6,739,305 | B2 * | 5/2004 | Takahara et al. ........... 123/196 R |
| 7,401,465 | B2 * | 7/2008 | Emmert et al. ................. 60/430 |
| 7,415,820 | B2 * | 8/2008 | Moorman ........................ 60/430 |
| 7,481,053 | B2 * | 1/2009 | Kitano et al. .................... 60/428 |
| 2008/0188351 | A1 | 8/2008 | Schiele et al. ................... 477/98 |
| 2009/0232673 | A1 * | 9/2009 | Reisch et al. ................. 417/364 |

FOREIGN PATENT DOCUMENTS

| DE | 197 50 675 C1 | 8/1998 |
| DE | 103 27 406 A1 | 2/2005 |
| DE | 10 2005 013 137 A1 | 9/2006 |
| JP | 2000046166 A | 2/2000 |
| WO | WO 2006/136320 A1 | 12/2006 |

* cited by examiner

*Primary Examiner* — Michael Leslie
(74) *Attorney, Agent, or Firm* — Alfred J. Mangels

(57) ABSTRACT

A hydraulic system for an automatic transmission operatively connected to an internal combustion engine that is operable in a start-stop mode. The hydraulic system includes a hydraulic energy source to supply the hydraulic system with hydraulic energy, the hydraulic energy source including at least one electrically driven hydraulic pump to supply the hydraulic system with hydraulic energy during a stopping phase of the internal combustion engine. To achieve a reduction in fuel consumption and $CO_2$ emissions, provision is included to enable the electrically driven hydraulic pump to be switched on in addition to a mechanically driven hydraulic pump, as needed during an operating phase of the internal combustion engine.

9 Claims, 2 Drawing Sheets

HYDRAULIC SYSTEM FOR AN AUTOMATIC TRANSMISSION

BACKGROUND OF THE INVENTION

1. Field of the Invention

The present invention relates to a hydraulic system for an automatic transmission associated with an internal combustion engine that is operable in start-stop operation, an automatic transmission equipped therewith, and a motor vehicle having such an automatic transmission.

2. Description of the Related Art

Automatic transmissions are known that include continuously variable, belt-driven conical-pulley transmissions (CVT), for example, or conventional stepped automatic transmissions. Such transmissions are enjoying increasing popularity, in particular in passenger cars, because of the high level of comfort and convenience, and also because of the reduction in fuel consumption that is attainable with them as compared with manual transmissions.

Drive trains having continuously variable transmissions include a start-up unit, a reversing planetary gearbox as the forward/reverse drive unit, a hydraulic pump, a variable speed drive unit, an intermediate shaft, and a differential, for example. The variable speed drive unit includes two conical pulleys and an endless torque-transmitting means. Each conical pulley includes a first, axially fixed conical disk and a second conical disk that is displaceable relative to the first conical disk in an axial direction. The endless torque-transmitting means runs between the conical pulleys and can be, for example, a steel thrust belt, a traction chain, or a belt. By the axial displacement of the second conical disk relative to the first conical disk, the running radius of the endless torque-transmitting means changes, and hence so does the transmission ratio of the continuously variable automatic transmission.

Continuously variable automatic transmissions require a particular hydraulic pressure level in order to be able to shift the axially movable conical disks of the variable speed drive unit at the desired speed at all operating points, and also to transmit the drive torque at a sufficient basic contact pressure, and without excessive wear. The hydraulic pump of the automatic transmission is normally driven by a main drive unit, in the case of passenger cars usually an internal combustion engine. After the drive unit comes to a stop the hydraulic system of the continuously variable automatic transmission is unpressurized, so that upon start-up a certain time interval passes at first within which to build up the hydraulic pressure to provide the contact pressure for the conical disks. If the continuously variable transmission is operated with too low a contact pressure, slippage of the endless torque-transmitting means can result, with the danger of damage to the transmission components. In the case of stepped automatic transmissions, if the hydraulic pressure is too low after start-up the clutches contained within them cannot be operated.

It is known to provide automatic transmissions that include a hydraulic control or hydraulic actuating components with an additional electric pump that supplies the hydraulic pressure before the main drive unit comes up to speed. With a start-stop module of that sort, it is possible to shut off the internal combustion engine of an automobile whenever traffic conditions require a stop, for example, which results in additional fuel savings.

With known automatic transmissions, the lowest occurring engine speed determines the design size of the hydraulic pump; hence the pump has a larger capacity than is necessary in most driving conditions, and it therefore consumes power unnecessarily. The supplementary start-stop pump with electric drive is not designed for high feed pressures, and thus it cannot meet high pressure demand peaks.

It is an object of the present invention to overcome the problems noted above.

SUMMARY OF THE INVENTION

The object is achieved in the case of a hydraulic system for an automatic transmission associated with an internal combustion engine operable in start-stop operation. The hydraulic system includes a hydraulic energy source to supply the hydraulic system with hydraulic energy, and at least one electrically driven hydraulic pump of the hydraulic energy source to supply the hydraulic system with hydraulic energy during a stopping phase of the internal combustion engine. The electrically driven hydraulic pump can also be switched on in accordance with need during an operating phase of the internal combustion engine.

The term stopping phase can be understood to mean an operating state of the internal combustion engine in which it is shut off, i.e., so that it is not providing any mechanical energy. The term operating phase of the internal combustion engine can be understood to mean an operating state in which the engine is turned on, i.e., is providing mechanical energy, for example to propel a motor vehicle equipped therewith as well as various units of the motor vehicle, for example the hydraulic system. For controlling or for changing between the stopping and operating phases, a start-stop module can be provided. The start-stop module can actuate the electrically driven hydraulic pump so that the latter can supply the hydraulic system with a moderate pressure during the stopping phases of the internal combustion engine, and/or directly after the internal combustion engine is started. Advantageously, the electrically driven hydraulic pump can also be switched on in driving situations where flow volume or pressure is critical, i.e., during the operating phase of the internal combustion engine, in order to supply the hydraulic, system with additional hydraulic energy.

A preferred exemplary embodiment of the hydraulic system in accordance with the present invention provides that the hydraulic energy source has a hydraulic pump that is driven mechanically by means of the internal combustion engine to supply the hydraulic system with hydraulic energy during the operating phases. The mechanically driven hydraulic pump can draw its energy advantageously directly from the internal combustion engine. Since internal combustion engines are usually operated at varying rotational speeds, the mechanically driven hydraulic pump can be designed for an operating point at which comparatively little mechanical energy is supplied by means of the internal combustion engine. In addition, note can be taken of what maximum pressure and/or flow volume must be available in such circumstances for reliable operation of the hydraulic system. Advantageously, it is possible with this design to also include in the calculation the flow volume and/or the hydraulic pressure made available by the electrically driven hydraulic pump, in which case a smaller overall design of the mechanically driven hydraulic pump is possible. Advantageously, that arrangement makes it possible for the mechanically driven hydraulic pump to be designed up to 30 percent smaller or weaker, for example, than the usual mechanically driven hydraulic pumps. Advantageously, a reduction in the fuel consumption and emissions of the internal combustion engine driving the hydraulic pump is possible as a result. The additional start-stop pump, or electrically driven hydraulic pump, can be designed for comparatively low delivery pressures, while it is possible to fill out or even out demand peaks within the framework of the available delivery pressure.

Another preferred exemplary embodiment of the hydraulic system in accordance with the present invention provides that the hydraulic energy source is associated with a pilot hydraulic circuit and a main control circuit of the hydraulic system. The hydraulic energy source can supply the pilot hydraulic circuit and the main control circuit with the hydraulic energy needed for operation. The pilot hydraulic circuit can be designed to actuate the main control circuit.

Another preferred exemplary embodiment of the hydraulic system in accordance with the present invention provides that the electrically driven hydraulic pump is associated essentially directly with the pilot hydraulic circuit. The present start-stop module, which is provided in order to supply some components with oil at moderate pressure during the stopping phases or holding phases, and/or directly after start-up of the internal combustion engine, can also be switched on in driving situations in which flow volume or pressure is critical, in order to supply at least the pilot hydraulic circuit with a pressure of 5 bar, for example. The mechanically driven hydraulic pump can advantageously be relieved by an amount of leakage of the pilot hydraulic circuit, while the electrically driven hydraulic pump only has to supply an additional capacity which that condition requires. As a result, the mechanically driven hydraulic pump, which operates at a higher pressure level, can advantageously be designed up to 30 percent smaller, for example.

Another preferred exemplary embodiment of the hydraulic system in accordance with the present invention provides that the mechanically driven hydraulic pump is associated directly with the main hydraulic circuit. The mechanically driven hydraulic pump can advantageously supply the main hydraulic circuit directly with a higher pressure level.

Another preferred exemplary embodiment of the hydraulic system in accordance with the present invention provides that the electrically driven hydraulic pump is associated with the main hydraulic circuit by a relief valve. Advantageously, by means of the relief valve, starting from a certain pressure an essentially non-pressure-reduced flow volume from the electrically driven hydraulic pump can be fed into the main hydraulic circuit. This is conceivable during a stopping phase, for example, i.e., in an operating phase in which the mechanically driven hydraulic pump is shut down. However, the desired relief is also possible during the operating phase of the internal combustion engine, where the mechanically driven hydraulic pump alone would provide too small a flow volume and/or pressure however, for example in driving conditions with a comparatively low speed of engine rotation and/or when the downstream hydraulic system has a high need for hydraulic energy.

Another preferred exemplary embodiment of the hydraulic system in accordance with the present invention provides that the mechanically driven hydraulic pump is associated with the pilot hydraulic circuit by a pressure-reducing valve. The pressure reducing valve is able to ensure that a comparatively low pressure level that is sufficient for its functioning can be maintained in the pilot hydraulic circuit, although the mechanically driven hydraulic pump supplies a high pressure level to the downstream hydraulic system.

Another preferred exemplary embodiment of the hydraulic system provides for the electrically driven hydraulic pump to be switched on during the operating phase of the internal combustion engine, depending upon a requisite pressure and/ or flow volume to supply main components of the main hydraulic circuit. Advantageously, the electrically driven hydraulic pump is only switched on if the hydraulic energy it provides is needed in the main hydraulic circuit. That makes it possible to operate the electrically driven hydraulic pump as seldom as possible, whereby fuel consumption and $CO_2$ emissions of the internal combustion engine can also be reduced. Operating situations in which pressure and/or volume are critical can be accommodated.

The object of the present invention is also achieved with an automatic transmission having hydraulic components of a hydraulic system as described above. The previously described benefits result.

Finally, the object of the present invention is also achieved with a vehicle having an automatic transmission as described above. The previously described benefits result.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
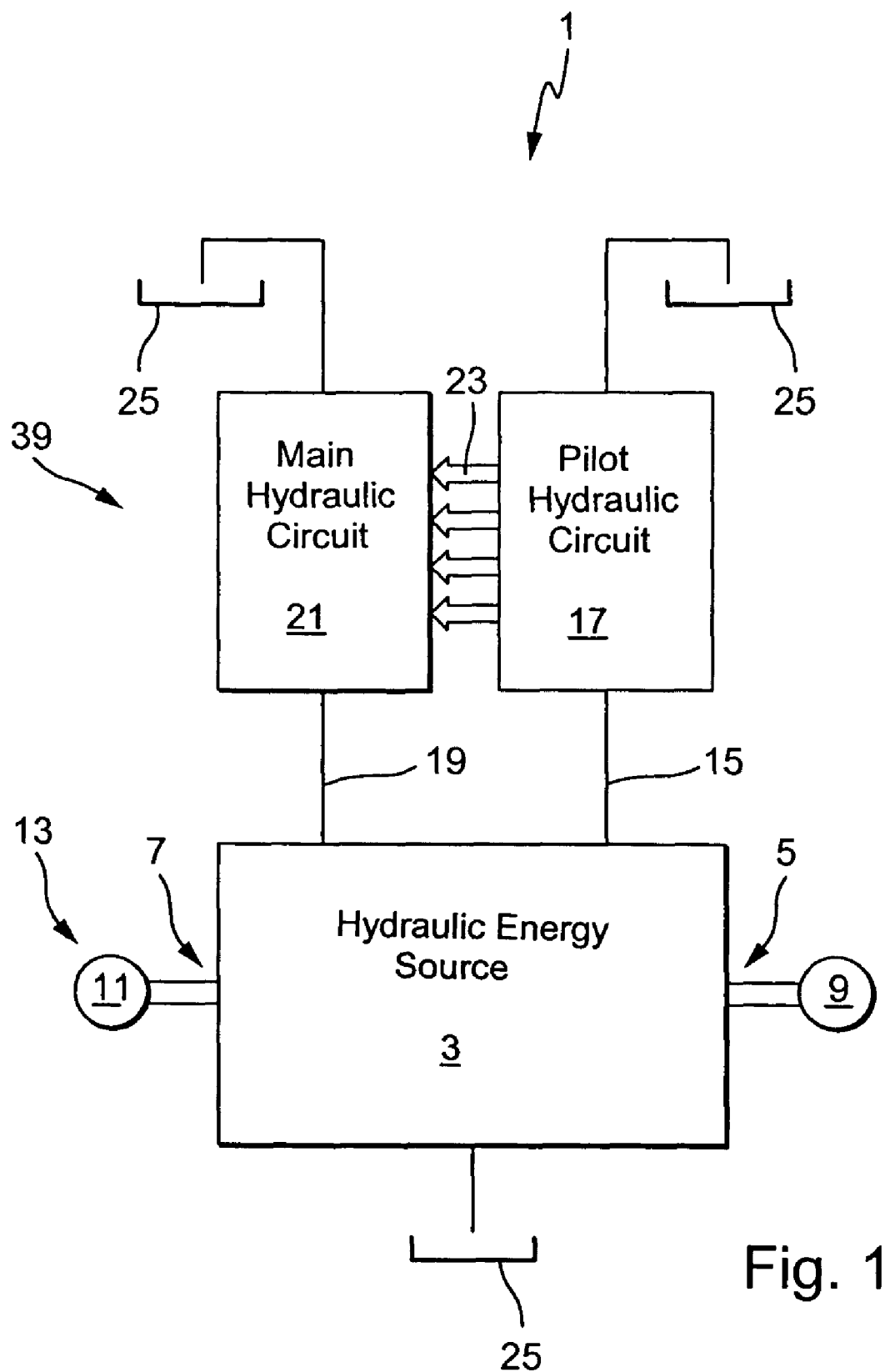
FIG. 1 is a block diagram of a hydraulic system having a hydraulic energy source including an electrically driven hydraulic pump and a mechanically driven hydraulic pump.

FIG. 1 shows a block diagram of a hydraulic system 1 with a hydraulic energy source 3. The hydraulic energy source 3 includes an electrically driven hydraulic pump 5 and a mechanically driven hydraulic pump 7. For energy coupling, electrically driven hydraulic pump 5 is connected to an electric motor 9 and mechanically driven hydraulic pump 7 connected to an internal combustion engine 11. The internal combustion engine 11 can be the drive unit of a vehicle 13, for example a motor vehicle.

The hydraulic energy source 3 is connected via a first feed conduit 15 to a downstream pilot hydraulic circuit 17 of hydraulic system 1, and via a second feed conduit 19 to a downstream main hydraulic circuit 21 of hydraulic system 1. The pilot hydraulic circuit 17 is designed to control hydraulic components or consumers of the main hydraulic circuit 21, as indicated in FIG. 1 by means of arrows 23. Hydraulic system 1 can form a closed circuit for a hydraulic medium, not shown in greater detail, and to that end has a preferably common tank 25 that is connected upstream of hydraulic energy source 3 and downstream of the pilot hydraulic circuit 17 and of the main hydraulic circuit 21.

Figure 2:
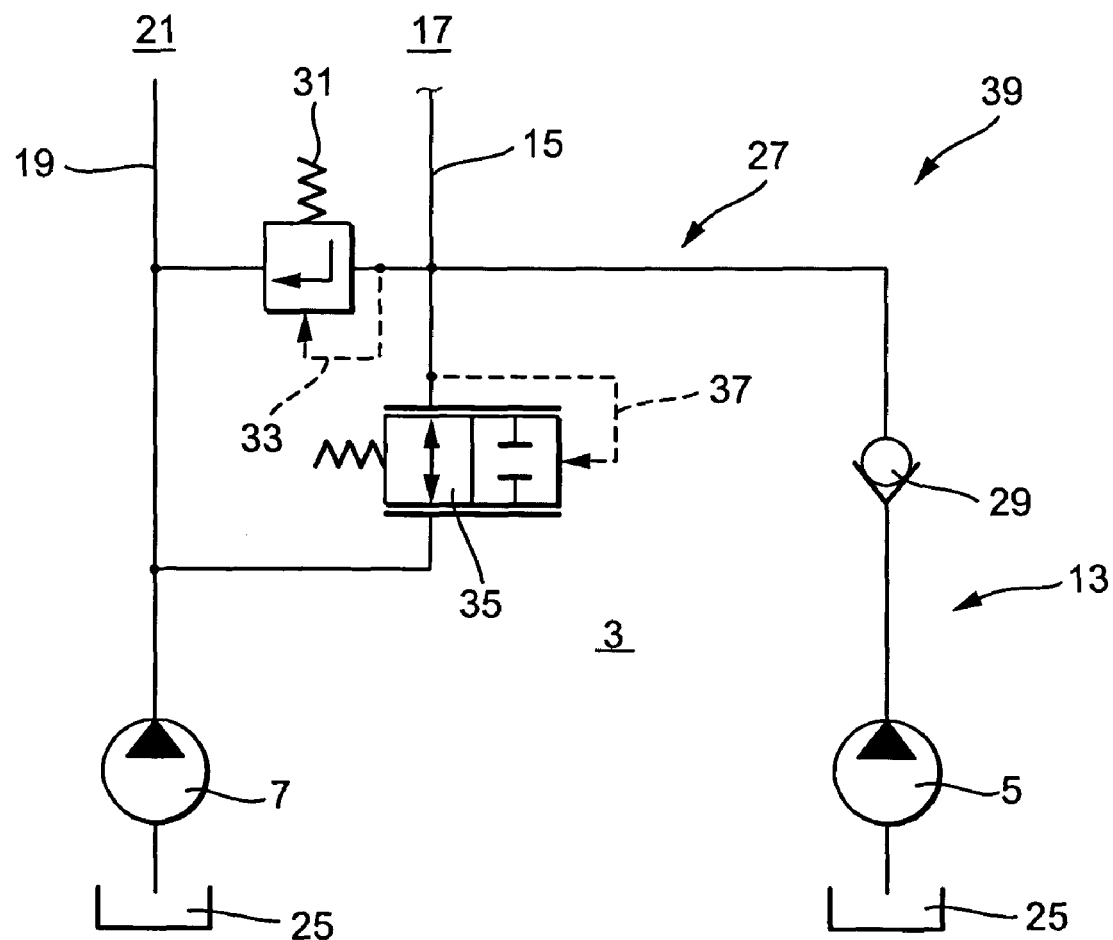
FIG. 2 is a hydraulic circuit diagram of the hydraulic system shown in FIG. 1.

FIG. 2 is a detail view of the hydraulic energy source 3 shown in FIG. 1. Hydraulic energy source 3 includes a valve system 27 connected downstream from the electrically driven hydraulic pump 5 and the mechanically driven hydraulic pump 7, and ahead of the feed conduits 15, 19. Valve system 27 includes a check valve 29 connected downstream of the electrically driven hydraulic pump 5. It is also possible, however, to integrate the function of the check valve 29 into the electrically driven hydraulic pump 5, so that when there is a stoppage it can prevent backflow of the hydraulic medium in the direction of the tank 25. Check valve 29 prevents backflow of the hydraulic medium through the electrically driven hydraulic pump 5 in the direction of the tank 25.

Electrically driven hydraulic pump 5 is connected to the first feed conduit 15, and thus substantially directly to the pilot hydraulic circuit 17. Furthermore, electrically driven hydraulic pump 5 is connected via a relief valve 31 to the second feed conduit 19, i.e., to the main hydraulic circuit 21. Relief valve 31 is connected between first feed conduit 15 and second feed conduit 19, and has a pressure feedback loop 33. Relief valve 31 can be designed so that it opens at a certain supply pressure of electrically driven hydraulic pump 5, for example approximately 5 bar, and transfers to the second feed conduit 19 of the main control circuit 21 a flow volume that exceeds a pilot leakage of pilot hydraulic circuit 17.

Mechanically driven hydraulic pump 7 is connected directly to the second feed conduit 19 and thus to the main hydraulic circuit 21. Furthermore, mechanically driven hydraulic pump 7 is connected via a parallel branch with a pressure reducing valve 35 of the first feed conduit 15, and thus to pilot hydraulic circuit 17. Pressure reducing valve 35 likewise has a pressure feedback loop 37, and can be designed so that a substantially high supply pressure of mechanically driven hydraulic pump 7 is reduced to a comparatively low pilot pressure in the pilot hydraulic circuit 17 and thus is supplied to that circuit.

As can be seen from FIG. 2, various operating states of the hydraulic energy source are conceivable. In a first operating state, which corresponds to an operating phase of internal combustion engine 11, for example, electrically driven hydraulic pump 5 can be switched off, in which case the main hydraulic circuit 21 can be supplied by mechanically driven hydraulic pump 7 with hydraulic energy directly, and the pilot hydraulic circuit 17 at a reduced pressure by means of pressure reducing valve 35.

In a second operating state, which can likewise correspond to an operating phase of the internal combustion engine, although at a comparatively low rotational speed and/or simultaneously with a need for a comparatively great quantity of hydraulic energy for the hydraulic circuits connected downstream, for example, electrically driven hydraulic pump 5 can advantageously supply the pilot hydraulic circuit 17 with hydraulic energy. In addition, if a sufficiently large flow volume is available, a branch flow can also be fed via relief valve 31 into the second feed conduit 19, I.e., to the main hydraulic circuit 21. In the second operating state it is thus possible to absorb load peaks of the main hydraulic circuit 21, in particular in minimal supply phases of the mechanically driven hydraulic pump.

In a third operating state, which corresponds to a stopping phase of internal combustion engine 11, for example, the electrically driven hydraulic pump 5 alone can take over the supply of the pilot hydraulic circuit 17 and at least partially that of the main hydraulic circuit 21. In that third operating state the hydraulic medium supplied by the electrically driven hydraulic pump 5 can be fed directly to the first feed conduit 15, and through relief valve 31 into the second 19. For that operating state the mechanically driven hydraulic pump 7 can also include a device to prevent backflow into the tank 25. Theoretically, a backflow through pressure reducing valve 35 in the direction of the main hydraulic circuit 21 is also conceivable, but only up to a maximum pressure or cut-off point, at which the pressure reducing valve 35 is closed by means of the feedback pressure loop 37. Pressure reducing valve 35 is designed as a 2/2 directional valve, while other configurations, such as 3/2 or 3/3 directional valves for example, are also conceivable. The pressure feedback loops 33 and 37 of relief valve 31 and pressure reducing valve 35 can be coordinated with each other, so that in each of the operating states of hydraulic energy source 3 described above essentially the same pilot pressure of the first feed conduit 15 or of the pilot hydraulic circuit 17 results.

To actuate the various operating states of the hydraulic energy source 3 a start-stop module (not shown) can be provided to supply some components of hydraulic system 1 with the hydraulic medium at moderate pressure in the stopping phases or holding phases, or directly after the internal combustion engine 11 is started. Advantageously, the start-stop module or start-stop functionality can also be switched on in driving situations of the vehicle 13, where flow volume and/or pressure are critical, in order to supply at least the pilot hydraulic circuit 17 with a pressure of 5 bar, for example. Advantageously, the mechanically driven hydraulic pump 7, or main pump, can be relieved thereby by the amount of the pilot leakage of the pilot hydraulic circuit 17, while the electrically driven hydraulic pump 5 only has to supply the additional capacity. As a result, the mechanically driven hydraulic pump 7, which operates at a higher pressure level, can advantageously be designed up to 30 percent smaller.

FIG. 2 shows an electrically driven hydraulic pump 5, which can be part of the start-stop module, for example, which supplies the hydraulic medium through check valve 29 into pilot hydraulic circuit 17 and supplies it to proportional solenoid valves situated there, which are not shown in greater detail in FIGS. 1 and 2. Relief valve 31 ensures that excess flow volume offered can flow into the main hydraulic circuit 21, because the pressure reducing valve 35 closes with respect to the main hydraulic circuit 21 when a nominal total pilot pressure, of 5.5 bar for example, is reached.

The hydraulic system 1 can be part of an automatic transmission 39 of a power train of the motor vehicle 13 for controlling the transmission.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system for an automatic transmission that is operatively connected to an internal combustion engine, said hydraulic system comprising:

a hydraulic energy source to supply the hydraulic system with hydraulic energy during an operating phase of the internal combustion engine and during a stopped phase of the internal combustion engine, wherein the hydraulic energy source is connected to a pilot hydraulic circuit and to a main hydraulic circuit of the hydraulic system, and wherein the pilot hydraulic circuit provides a pilot pressure for controlling operation of hydraulic components of the main hydraulic circuit;

a mechanically driven hydraulic pump driven by the internal combustion engine to supply the hydraulic system with hydraulic energy during the operating phase of the internal combustion engine; and at least one electrically driven hydraulic pump included in the hydraulic energy source to supply the hydraulic system with hydraulic energy during a stopped phase of the internal combustion engine, and switching means wherein the electrically driven hydraulic pump is switched on as needed during the operating phase of the internal combustion engine to supply additional hydraulic energy.

2. A hydraulic system in accordance with claim 1, wherein the electrically driven hydraulic pump is connected directly to the pilot hydraulic circuit.

3. A hydraulic system in accordance with claim 1, wherein the mechanically driven hydraulic pump is connected directly to the main hydraulic circuit.

4. A hydraulic system in accordance with claim 1, wherein the electrically driven hydraulic pump is connected to the main hydraulic circuit through a relief valve.

5. A hydraulic system in accordance with claim 1, wherein the mechanically driven hydraulic pump is connected to the pilot hydraulic circuit by a branch conduit through a pressure reducing valve.

6. A hydraulic system in accordance with claim 1 wherein the electrically driven hydraulic pump is switched on during the operating phase of the internal combustion engine as a function of a required hydraulic pressure and/or hydraulic flow volume in order to supply components of the main hydraulic circuit.

7. An automatic transmission including hydraulic components of a hydraulic system in accordance with claim 1.

8. A motor vehicle including an automatic transmission in accordance with claim 7.

9. A hydraulic system in accordance with claim 7, wherein the pressure reducing valve reduces the pressure of hydraulic energy supplied by the mechanically driven hydraulic pump to the pilot hydraulic circuit to a pilot pressure.

* * * * *